United States Patent Office 2,749,354
Patented June 5, 1956

2,749,354

ANTHRAQUINONE DYES AND INTERMEDIATES

Donald R. Baer, Wilmington, Del., assignor to E. I. du Pont de Nemours and Company, Wilmington, Del., a corporation of Delaware No Drawing. Application November 27, 1953, Serial No. 394,889

2 Claims. (Cl. 260—326)

This invention relates to the preparation of anthraquinone dyes and dye intermediates, and more particularly to the preparation of N-substituted-1-amino-4-hydroxy-2,3-anthraquinone dicarboximides which may also be referred to as 2 - substituted - 4 - amino - 11 - hydroxy - anthra[2,3-c]pyrrol-1,3,5,10-tetrones, which have the general formula:

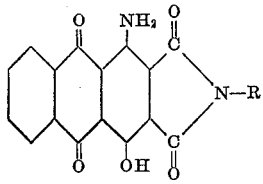

in which R stands for an alkoxyalkyl radical of the class consisting of 3-methoxypropyl, 3-ethoxypropyl, 2-methoxyethyl and 2-ethoxyethyl.

In the dyeing of "Dacron" polyester fiber and of "Orlon" polyacrylic fiber difficulty has been experienced in obtaining dyes which would have the desired affinity for these new fibers and also have the fastness properties required of good dyes. While the known 1,4-diamino-2,3-anthraquinone dicarboximides dye "Dacron" polyester fiber in desirable bright blue shades, they are greenish-blues as distinguished from reddish-blues and must be mixed with reddish-blue or violet dyes to give royal blue shades. Certain of this class of dyes when converted to the quaternary ammonium salts also dye "Orlon" polyacrylic fiber in desirable greenish-blue shades. No dye has yet been found, nor is any combination of dyes available, to dye these fibers in the reddish-blue or royal blue shades having good fastness to light. The known colors that can be mixed with the greenish-blues to give royal blue do not have comparative light fastness, and therefore the mixed colors are unsatisfactory.

It is therefore an object of this invention to produce a series of dyes ranging from powder blue to violet shades, all of which tend to be much redder in hue than the 1,4-diamino-2,3-anthraquinone dicarboximides but which exhibit satisfactory light fastness when applied to "Dacron" polyester fibers and "Orlon" acrylic fibers. It is a further object of the invention to provide reddish-blue dyes which can be mixed with previously known greenish-blue dyes to produce desirable deep blue or royal blue shades.

The compounds of this invention may be prepared from 1 - amino - 4 - hydroxy - 2,3 - anthraquinone dicarboxylic acid or its anhydride. These intermediates may be prepared by the process as more particularly disclosed by C. Marschalk, Bulletin Soc. Chim. [5] 2, 1809 (1935). The 1 - amino - 4 - hydroxy - 2,3 - anthraquinone dicarboxylic acid or its anhydride is reacted with an aliphatic amine by the processes more particularly illustrated in the following examples, in which the parts used are by weight.

Example 1

Two (2) parts of 1-amino-4-hydroxy-2,3-anthraquinone dicarboxylic acid anhydride and 1 part of 3-methoxypropylamine in 6 parts of nitrobenzene are heated at 120° C. for two hours. After cooling to 25° C., 16 parts of methyl alcohol are added and the reaction mass is filtered. The solid product is washed with 6 parts of methanol and dried at 100° C. The dry product is insoluble in water and dyes polyester fibers blue-violet shades. It has the analysis C, 61.4%; H, 4.40%; N, 8.1%, and is considered as having the formula:

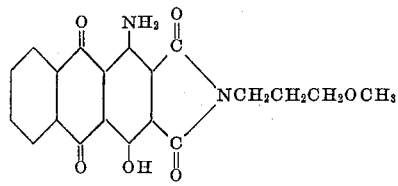

The 3-methoxypropylamine of this example may be replaced with an equivalent amount of one or a mixture of 3 - ethoxypropylamine, 2 - methoxyethylamine, or 2 - ethoxyethylamine to give closely related dyes.

The 3-methoxypropyl derivative of Example 1 is the outstanding dye of this series, particularly because it dyes "Dacron" polyester fiber in bluish-violet shades with a light fastness rating of 7.

The 3-methoxypropyl derivative when dyed with the corresponding 1,4-diamino derivative produces a royal blue dye which has a light fastness rating of 7. It shows its first break in the fadometer at about 140 hours.

While in the condensation of the dicarboxylic acid or the anhydride a small amount of replacement of the hydroxyl group takes place, the amount is extremely small, being apparently less than 5% of the total dyestuff.

I claim:

1. Bluish-gray to reddish-blue dyes of the general formula:

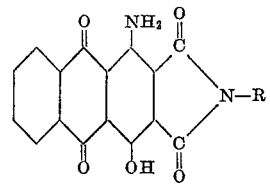

in which R stands for an alkoxyalkyl radical of the class 3-methoxypropyl, 3-ethoxypropyl, 2-methoxyethyl, and 2-ethoxyethyl.

2. The reddish-blue dyestuff of the formula:

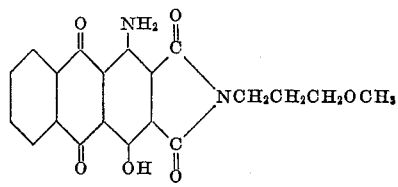

References Cited in the file of this patent

UNITED STATES PATENTS 2,628,963     Laucius et al.             Feb. 17, 1953

FOREIGN PATENTS 614,969     Great Britain             Dec. 30, 1948

OTHER REFERENCES

Chem. Abst., vol. 30, p. 1374 (1936), citing Marschalk (Bull. Soc. Chim.).

Elsevier's Encyclopedia of Org. Chem., vol. 13, p. 696 (1946).

Bull. Soc. Chim. [5] 2, pp. 1809–30 (1935).

Bull. Soc. Chim. [5] 4, pp. 184–93 (1937).